United States Patent Office 2,891,959
Patented June 23, 1959

2,891,959
PROCESS OF PREPARING 3-(2-HYDROXYETHYL) PYRIDINE

Francis E. Cislak, Indianapolis, Ind., assignor to Reilly Tar & Chemical Corporation, Indianapolis, Ind., a corporation of Indiana No Drawing. Application May 8, 1957
Serial No. 657,709

3 Claims. (Cl. 260—297)

My invention relates to a process of preparing 3-(2-hydroxyethyl)pyridines. More specifically it relates to a process of preparing 3-(2-hydroxyethyl)pyridines by the reaction of a 3-picolylsodium with anhydrous formaldehyde:

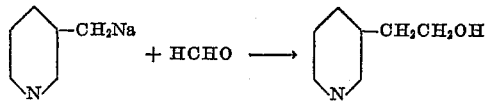

It has long been known that the synthesis of "pyridine derivatives which have an alcohol group in the side chain in either the 2- or 4-position is readily accomplished by condensations of the 2- or 4-methylpyridines with an aldehyde, .... The reaction, of course, does not occur with the 3-methylpyridine derivatives" (Elderfield, Heterocyclic Compounds, vol. I, page 582, New York 1950). 2-(2-hydroxyethyl)pyridine and 4-(2-hydroxyethyl)pyridine are made commercially by condensing 2-picoline and 4-picoline with aqueous formaldehyde. These ethanolpyridines are important intermediates for the preparation of 2-vinylpyridine and 4-vinylpyridine.

3-vinylpyridine is not an industrial chemical. Commercial production of 3-vinylpyridine is awaiting the development of a suitable method of preparing 3-ethanolpyridine. I have discovered a method of causing the condensation of formaldehyde with 3-picoline to make 3-(2-hydroxyethyl)pyridine. In general my newly discovered method comprises reacting 3-picolylsodium with anhydrous formaldehyde.

My invention will be described more fully by means of the specific examples given below:

Example 1

One hundred fifteen grams (one mol) of finely divided 3-picolylsodium are dispersed in about 1,000 cc. of diethylether. To this dispersion of 3-picolylsodium in diethylether is added about 30 grams (one mol) of gaseous anhydrous formaldehyde. The reaction mixture is mechanically stirred during the addition of the anhydrous formaldehyde and for about two to six hours after all of the formaldehyde has been added. The 3-(2-hydroxyethyl)pyridine formed during the reaction period is isolated in any suitable manner.

One way of isolating the 3-(2-hydroxyethyl)pyridine is as follows: Water is added slowly to the ether dispersion to hydrolyse any unreacted 3-picolylsodium and the sodium derivative of the 3-(2-hydroxyethyl)pyridine. Then carbon dioxide is introduced to neutralize the caustic soda. Upon settling, two layers result, an aqueous layer and an ether layer. The ether layer is separated and the 3-(2-hydroxyethyl)pyridine is recovered from it by distillation.

The reaction in diethylether may be conducted at room temperature or at relatively low temperatures of from about −20° C. to about 0° C. Or the reaction may be conducted at above atmospheric pressure and at relatively high temperatures of from about 50° to about 75° C.

In place of the diethylether I may use other inert reaction media, such as dioxane, dimethylether, or the like.

Example 2

The procedure of Example 1 is repeated with the exception that 5-methyl-3-picolylsodium is used in place of the 3-picolylsodium and 5-methyl-3-(2-hydroxyethyl) pyridine is formed.

The 3-(2-hydroxyethyl)pyridine of my invention is useful for the preparation of 3-vinylpyridine.

I claim as my invention:
1. In the process of preparing 3-(2-hydroxyethyl)pyridines having the general formula:

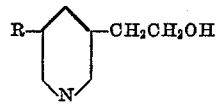

wherein R is selected from the group consisting of hydrogen and lower alkyl the steps which comprise reacting a 3-picolylsodium with anhydrous formaldehyde and recovering the resultant 3-(2-hydroxyethyl)pyridine.

2. In the process of preparing 3-(2-hydroxyethyl)pyridine the steps which comprise preparing a dispersion of finely divided 3-picolylsodium in an inert reaction medium, adding anhydrous formaldehyde to form a sodium derivative of 3-(2-hydroxyethyl)pyridine, and recovering the 3-(2-hydroxyethyl)pyridine.

3. The process of claim 2 in which the picolylsodium used is 5-methyl-3-picolylsodium.

References Cited in the file of this patent
Bergmann: J. Chem. Soc., 1936, pages 412–13.
Baumgarten et al.: Chem. Abst., 34, p. 5845 (1940).
Elderfield: "Hetero. Cmpds.," vol. 1, p. 582, N.Y. (1950).
Schmelkes et al.: J. Am. Chem. Soc., 61, pp. 2562–3 (1939).